INVENTOR
ARNOLD H. JESSEN
BY
ATTORNEY

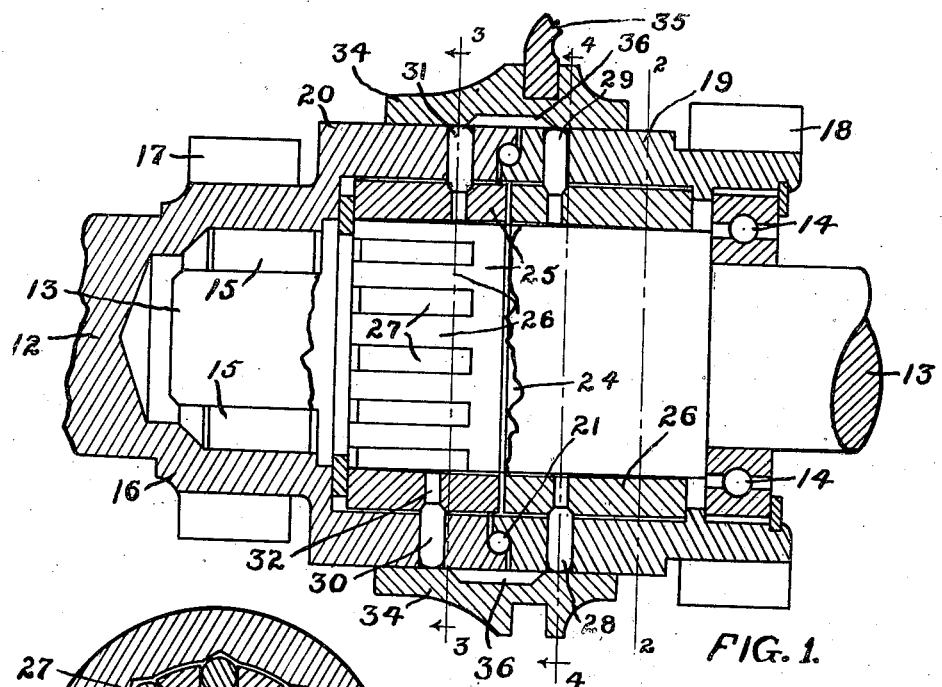
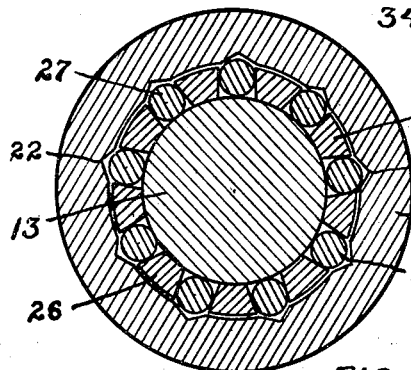
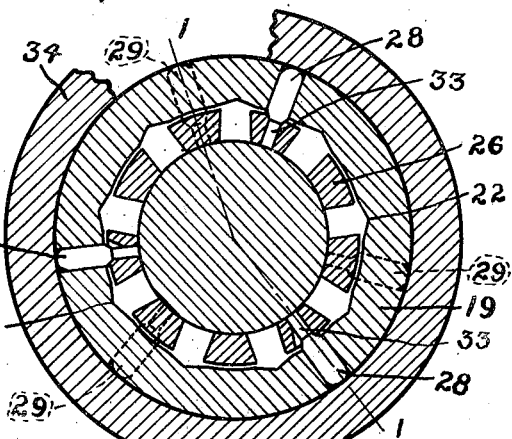
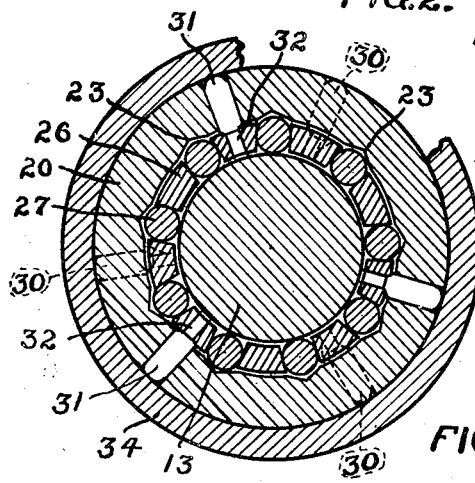
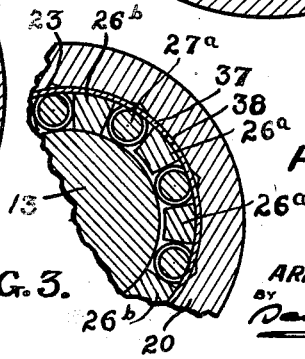

July 23, 1940. A. H. JESSEN 2,208,674
SELECTIVELY CONTROLLED CLUTCH TRANSMISSION MECHANISM
Filed Aug. 22, 1938 3 Sheets-Sheet 3

INVENTOR
ARNOLD H. JESSEN
BY
ATTORNEY

Patented July 23, 1940

2,208,674

UNITED STATES PATENT OFFICE 2,208,674

SELECTIVELY CONTROLLED CLUTCH TRANSMISSION MECHANISM

Arnold H. Jessen, Los Angeles, Calif.

Application August 22, 1938, Serial No. 226,092

19 Claims. (Cl. 192—48)

This invention relates to selectively controlled torque actuated clutch transmission mechanisms of the same general type as that disclosed in my pending application No. 130,837, filed March 15, 1937, one object being to improve upon the structure thus disclosed by rendering it simpler and less expensive in production. A further object is to reduce to the practical minimum the pressure on the clutch elements required in transmitting the power.

Figures 10, 11:
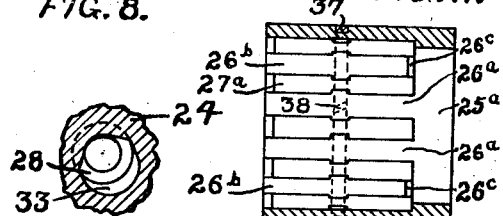
Figure 13:
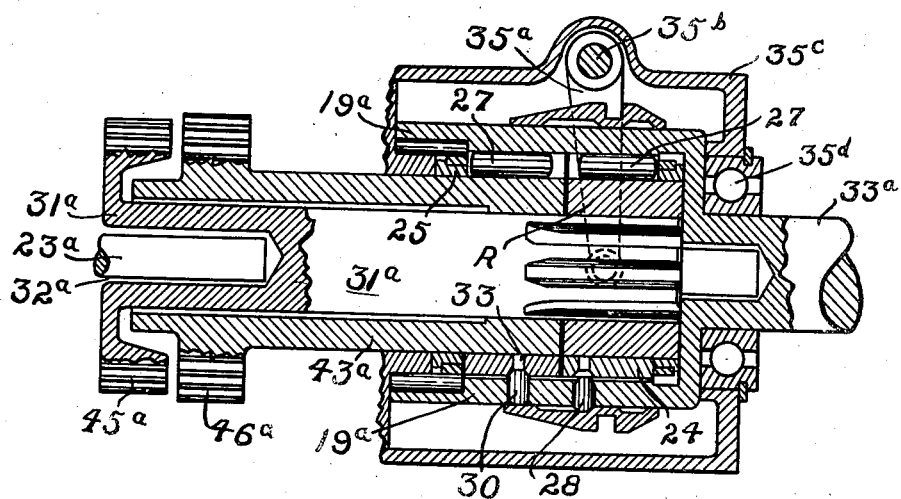
Figure 14:
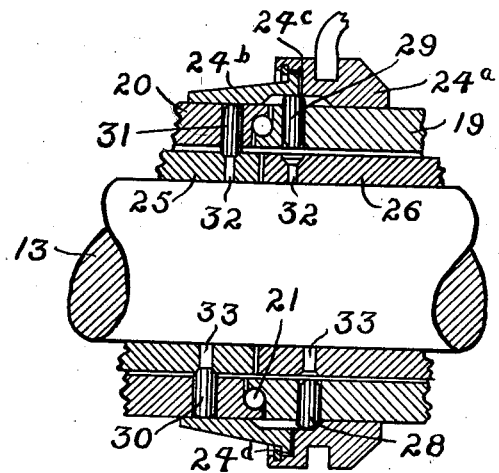

In the drawings, Fig. 1 is a longitudinal section taken through the invention on line 1—1 of Fig. 4, showing the parts in neutral or unclutched position; Figs. 2, 3 and 4 are transverse sectional views taken on lines 2—2, 3—3 and 4—4, respectively, of Fig. 1; Figs. 5, 6, 7 and 8 are sectional views like the central portion of Fig. 1 but showing the controlling mechanism in different positions; Fig. 9 is a fragmentary sectional view, on an enlarged scale, of parts shown in Fig. 4; and Fig. 10 is another fragmentary sectional view taken at right angles to that of Fig. 9, as on the line 10—10 thereof; Fig. 11 is a sectional view on a reduced scale of a modified form of roller cage and rollers; Fig. 12 is a transverse sectional view through the cage and rollers of Fig. 11, but drawn to a larger scale; Fig. 13 shows my invention applied to a somewhat different structure from that of the preceding figures, and Fig. 14 is a view similar to Fig. 6 but showing a modified form of collar or sleeve.

Referring to the drawings, 12 designates a rotatable driving member, such as a shaft. In axial alinement with the member 12 is a driven member 13. Between these members are mechanisms through which power may be transmitted from one to the other and at variable speeds, as desired. While the invention is adaptable for use in many relations, it has been designed with special reference to automotive vehicles as a transmission gearing and, for purposes of this description, it will be assumed that the shaft 12 is driven from a suitable prime mover, such as the crank-shaft of an interior combustion engine, and the member 13 is the shaft which leads to the usual universal joint in the shaft which extends to the differential gearing. The shaft 13 is mounted in suitable roller bearings at 14 and 15, the latter being within a bell-shaped housing 16, which is preferably an integral part of the shaft 12 and is also the central part of a gear 17 which forms a part of a train of gears, not shown, through which power may, if desired, be transmitted to a larger gear 18 which surrounds the shaft 13 and turns thereabout on the bearings 14.

The train of gearing connecting the gears 17 and 18 are not shown because they are conventional in automotive-transmission structures and are well understood.

The gear 18 is connected, or is preferably made integral, with a hollow, cylindrical member 19 which surrounds the shaft 13 in the direction of the gear 17, but is spaced from said shaft, for a reason which will hereinafter appear. The bell-like housing 16 of the gear 17 is likewise provided with a hollow cylindrical member 20 of the same diameter as the member 19. These members 19 and 20 abut at their adjacent ends except that they are separated by a set of roller bearings 21, the ends of the members being shaped to form a suitable race-way for the balls. These bearings serve not only to reduce friction but to help hold the members in alinement. These members are perfectly smooth or cylindrical on their outer surfaces but are provided with longitudinally extending grooves on their inner surfaces, the grooves in the members 19 and 20 being designated 22 and 23, respectively. These grooves are shallow and are V-shaped, as shown, for a reason to be presently explained.

As indicated in Fig. 1, the shaft 13 is a one-piece member that is enlarged between the bearings 14 and 15. That is my preferred structure because of its simplicity. However, the enlarged part of the shaft may obviously be formed by securing a sleeve above the shaft. In either case, the outer surface of the shaft or of the sleeve is perfectly smooth and cylindrical.

Mounted end to end upon the shaft 13 transversely opposite the grooved portion of the members 19 and 20 are two cages 24 and 25. As best seen in Fig. 1 where a portion of the shaft 13 is broken away for clearness of illustration, the adjacent ends of these cages are continuous circumferentially, forming rings or relatively narrow sleeves, from each of which projects a series of fingers 26. These fingers are spaced equidistantly and, between them, provide pockets for a series of clutch members 27, shown as rollers. There is a roller within each pocket, and the pockets correspond in number to the V-shaped grooves in the members 19 and 20. In diameter, these members 27 are somewhat greater than the space between the shafts 13 and 20; but when they are in mid position opposite their respective grooves 22 and 23, as in Figs. 2 and 3, they project into the grooves and do not touch the member 19 or 20. That is their position when the parts are in neutral or non-transmitting relation. Further, the cages 24 and 25 are slightly spaced from the members 19 and 20. When, therefore, the parts are in neutral position there is no contact between the latter member and the cages or rollers. The cages, however, are frictionally contacted with the shaft 13 so as to turn therewith when permitted so to do. As indicated in Fig. 1 the outer or free ends of the fingers 26 are bent slightly toward the shaft so as to grip it resiliently.

The cages with their rollers, are held in what may be considered their normal or neutral positions by control pins 28, 29, 30 and 31. These pins extend radially through and are carried by the members 19 and 20. Fig. 4 shows three of these control pins 28 spaced equidistantly in the member 19. Between these pins, but slightly out of transverse alinement therewith, are the pins 29, indicated in dotted lines in Fig. 4. One of each of these pins 28 and 29 is shown in Fig. 1, from which it will be seen that the pins 28 are somewhat to the right of the pins 29. Similarly, the pins 30 and 31 are carried by the member 20. The three pins 31 are shown in full lines in Fig. 3, and the pins 30 are indicated therein by dotted lines. These two sets of pins, 30 and 31, are also out of transverse alinement. As shown, therefore, and as preferred, there are three pins in each of the four sets, and they are spaced equidistantly about the cages 24 and 25. The pins are preferably cylindrical and move with an easy sliding fit within radial bores in the respective members 19 and 20. The inner ends of the pins are tapered to form truncated cones, and the length of the pins is slightly greater than the thickness of the members which carry them.

In alinement with the pins 28 to 31 when the parts are in neutral position, the cages 24 and 25, or their fingers 26, are provided with sockets 32 or 33. The sockets 32 cooperate with the pins 29 and 31, while the sockets 33 cooperate with the pins 28 and 30. The sockets are preferably formed by drilling or otherwise forming radial holes through the cages or their fingers and then reaming the outer ends of the holes to fit the truncated conical ends of the respective pins. The reamed part of the sockets 32 are adapted to fit about the ends of the pins throughout their entire circumferences so that, when the pins are fully seated, there can be no rotative movement of the cages as respects the members 19 and 20 which carry the pins. The sockets 33, however, are elongated in one direction circumferentially of the cage, as shown in Fig. 10, so that, when the pins 28 or 30 are seated therein, the cages may turn slightly in one direction from their neutral positions. This is for a purpose which will be presently set forth.

Surrounding the members 19 and 20 is a collar or sleeve 34 which is adapted to be slid back and forth on said members by an operating yoke or element 35, which yoke may be moved from any place which is convenient to the operator. Intermediate its ends, the sleeve 34 is provided with an interior circumferential groove 36, the marginal edges of which are tapered divergently, as shown, to form cams for forcing the pins 28, 29, 30 and 31 inwardly. It will be noted that the outer ends of the pins are slightly rounded to assist in this camming action. When the collar or sleeve 34 is in its central or neutral position, as in Fig. 1, all of the said pins are depressed and both cages 24 and 25, are held in their neutral positions, as in Fig. 2. When, however, said collar is slid in either direction from this neutral position, some of the pins are released and permitted to move outwardly into the groove 36, thereby releasing the cage with which they cooperate and permitting it to shift circumferentially to cause the rollers controlled by that cage to ride up the inclined cam surfaces of the grooves 22 or 23, as the case may be, thus to cause the corresponding member 19 or 20 to clutch the shaft 13 and rotate it with said member.

Figure 5:
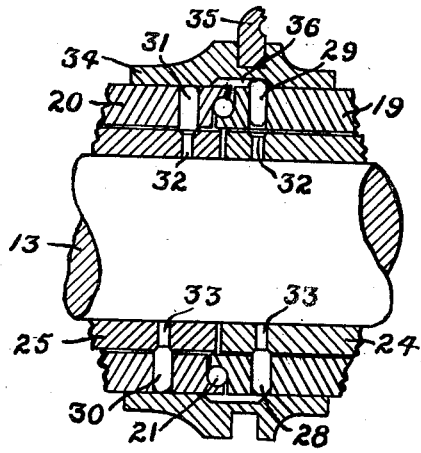

*Operation.*—Assuming that the invention is in use as the transmission mechanism in an automotive vehicle, that the driving member 12 is rotating and the parts are in the neutral position of Fig. 1, no power is being transmitted to the driven shaft 13 although both members 19 and 20 are rotating, but at different speeds, owing to their connection through the usual train of gearing, not shown. All the control pins 28, 29, 30, and 31 are depressed and the cages 24 and 25 are both held in their central or neutral positions, as in Figs. 2 and 3. All of the rollers 27 are out of contact with the members 19 and 20. If, now, the collar or sleeve 34 be shifted to the right to what may, for purposes of this description, be called its second position, as indicated in Fig. 5, the set of pins 29 are released so that they no longer function. That is to say, their outer ends are uncovered and may move into the groove 36. The pins may be thrown outwardly through centrifugal action or they may be cammed outwardly as the released cage shifts circumferentially. In any event, the pins 29 are now inoperative and, so far as they are concerned, the cage 24 is free and the member 19 may turn thereon. But the pins 28 are not released but continue to project into their sockets 33. These are the sockets which, as shown in Figs. 9 and 10, are slightly elongated in one direction. At the instant of release of the cage 24 by the pins 29, the pins 28 are still in engagement with the cage 24 at one end of the elongated socket 33 and thus hold the cage from shifting to the right, as seen in Fig. 9. However, it may shift in the opposite direction, owing to the elongation, sufficient to cause the rollers of cage 24 to roll up one side of the V-shaped grooves 22, thus to clutch the shaft 13 to the member 19. This member is rigidly connected with, or is an integral part of the slow moving gear 18. When, therefore, the parts are in this second position, the shaft 13 is positively rotated in one direction only, being free to rotate independently of the gear 18 in the opposite direction, thus providing for free wheeling when in low gear.

Figure 6:
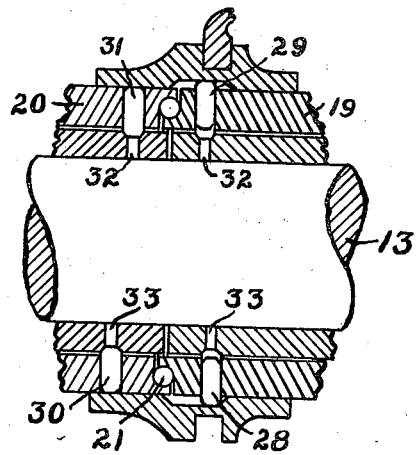

Suppose, now, the collar or sleeve 34 be further shifted to the right, Fig. 1, into its third position, as indicated in Fig. 6. Both sets of pins 28 and 29 are released and the cage 24 is free to shift in either direction, from its first or neutral position. But in so shifting, its rollers climb one side or the other of the V-shaped grooves 22 and clutch the shaft to the member 19. In this third position, therefore, the vehicle is in low gear and is positively clutched to the member 19 whether the power be transmitted from the said member to the shaft or from the shaft to the member, as in going down a grade when the vehicle tends to travel faster than the engine speed permits. In this third position, therefore, there is no free wheeling.

Figure 7:
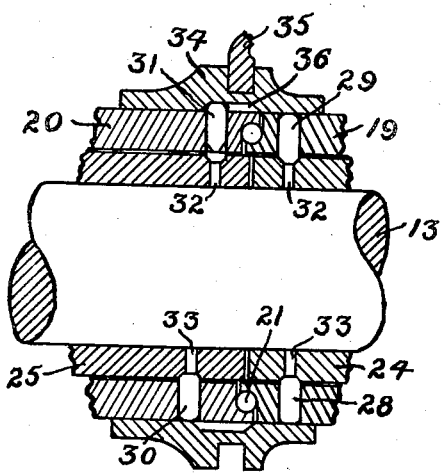

If, now, the collar 34 be shifted backwardly, or to the left in Fig. 1, past the neutral and into the fourth position, the parts will then be as in Fig. 7. The pins 31 are released and are inoperative; but the pins 30 are held depressed into their elongated slots or sockets in cage 25, said sockets being the same as is shown in Fig. 10. The driving member 20, which is the fast driving member, is now clutched with the shaft 13 to drive it positively in one direction but to permit free wheeling in case the shaft tends to turn faster than the member. The operation is the same as in the second position except that the power is transmitted from the fast moving member 20 and not from the slow moving member 19, which is now unclutched, since both sets of pins 28 and 29 are held depressed.

Figure 8:
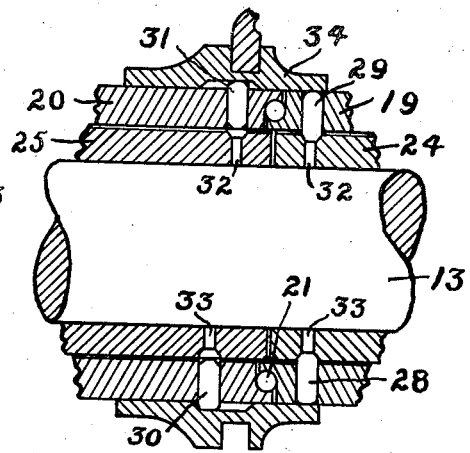
Figure 9:
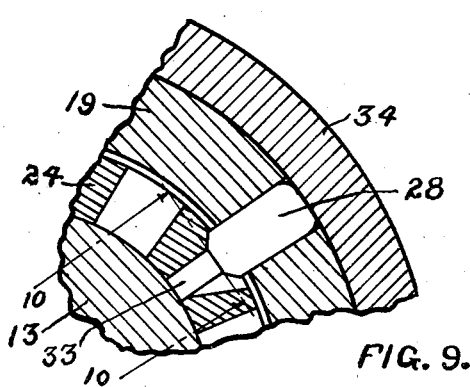

When the collar 24 is moved to its final or fifth position, as indicated in Fig. 8, both sets of pins 30 and 31 are released and the shaft 13 is clutched to the member 20 in both directions and there is no free wheeling, as was the case when in the third position.

One feature of my invention may now be more particularly explained. As has been pointed out, the V-shaped grooves 22 and 23 are in the members 19 and 20, respectively. Heretofore, as far as I am aware, these grooves or their equivalent have been on the driven member itself, while the smooth surfaces with which the rolling elements cooperate are on the interior of the driving members. In other words, the prior structures are reversed from that shown and described herein. I consider my present arrangement of these parts advantageous, particularly for the reason that the clutching elements are located as far as practicable from the axis of rotation of the driven member where a minimum of stress is sufficient to transmit the power.

In Figs. 11 and 12 I have shown a modified form of cage for the rollers, and the latter are also modified to cooperate with that cage. As has been described, the cages 24 and 25 are each provided with a series of rigid fingers 26, nine such fingers being shown and preferred. When the cages are released from their control pins, they should not turn too easily upon the shaft 13. If they do, the rollers may not climb the inclined sides of the grooves 22 or 23 but may push the cages with them. For that reason, the fingers 26 of Fig. 1 were turned inwardly slightly at their outer or free ends to clamp the shaft 13 slightly and thus produce enough friction to prevent the cages from turning too freely on the said shaft. While that structure has proven entirely satisfactory, it is thought that, owing to wide changes in temperature, the fingers 26 may either clamp the shaft too firmly and thus set up unnecessary friction and wear, or may clamp it too loosely and thus fail to hold the cages while the rollers are climbing the cam surfaces of the grooves 22 or 23. For that reason, I have devised the structure shown in Figs. 11 and 12 in which some of the fingers are severed from the rest of the cage and are pressed bodily against the shaft 13. Thus, in Fig. 11, in which the ring part of the cage is designated 25ᵃ, the fingers 26ᵃ are entire and project from the ring 25ᵃ, as in the other structure. The fingers 26ᵇ are severed from the ring at 26ᶜ and merely fill in between the adjacent rollers. To hold these loosened fingers in place and to cause them to press against the shaft 13, I surround the set of fingers with a resilient band 37 which, when detached, has a lesser circumference than the cage and, when attached, is distended so as to press upon the fingers. Preferably, this is a metal band, such as steel, which is split transversely at one point, as indicated in dotted lines at 38, in Fig. 11. To receive this band and maintain it in position, the outer surfaces of the fingers are grooved so that the outer surface of the band is substantially flush with the outer surfaces of the fingers. To accommodate the band, the rollers 27ᵃ are each grooved circumferentially, as best shown in Fig. 12, in which the split 38 in the band 37 is also shown. This figure further shows the severed fingers 26ᵇ contacting with the shaft 13 to create the necessary friction for holding the cage, while the other fingers 26ᵃ are free from the shaft.

Preferably, and as shown, there are nine fingers on each cage and every third finger is severed. There will, with this arrangement, be three fingers frictionally engaged with the shaft and these fingers are spaced equidistantly about the latter, thus balancing the action and contributing to smoothness of operation.

In Fig. 13 I have shown my invention applied to a structure similar to that shown in my Patent No. 1,707,399, April 2, 1929, particularly in Fig. 6 thereof. As far as they are applicable, the reference numerals above employed will be used in describing Fig. 13. The control pins 28 and 30, the rollers 27, the roller cages 24 and 25, with their sockets 33 are substantially the same and are given the same reference numerals. 31ᵃ is a slow speed shaft, the same being provided with a pinion 45ᵃ, these parts corresponding to the similar parts 31 and 45 of Fig. 6 of my above-mentioned patent. The shaft 31ᵃ is axially bored at 32ᵃ to receive the end of and center the drive shaft 23ᵃ. Surrounding the shaft 31ᵃ is a tubular shaft 43ᵃ which corresponds to the shaft 43 of said patent. Splined on the end of shaft 31ᵃ and turning therewith is a ring R; and a pinion 46ᵃ corresponding to pinion 46 of the patent, is at its other end adjacent the pinion 45ᵃ.

Whereas in Fig. 1 of this application the members 19 and 20 are separate and are rigidly connected with the gears 18 and 17, respectively, in Fig. 13, the place of these members is taken by a single cylindrical member 19ᵃ outside the roller cages, and this member is integral with or rigidly attached to the driven shaft 33ᵃ, the same corresponding to the shaft 33 of my said patent. The collar or sleeve 34 is substantially the same as is shown in Fig. 1 of this application. The means for sliding it is somewhat different, the same comprising a shifting yoke 35ᵃ which is secured to a rock shaft 35ᵇ mounted in a casing 35ᶜ and rocked by any suitable means. The casing is provided with a roller bearing 35ᵈ for the driven shaft 33ᵃ. Although not specifically illustrated, it is to be understood that the shaft 43ᵃ and the ring R are smooth circumferentially while the interior surface of the member 19ᵃ is provided with V-shaped grooves, like 22 and 23 of Figs. 2 and 3 respectively, to cooperate with the rollers 27. The manner in which the control pins 28 and 30 are manipulated by the slide-collar 24 is the same as has been hereinbefore described.

Fig. 14 is the same as Fig. 6 except as to the sliding collar or sleeve 34. As will best be seen from Fig. 1, the members 19 and 20 are turned at different speeds. The collar is one integral piece. Consequently, if it turns with the high speed member 20 it must necessarily rotate about the slower-speed member 19; and conversely, if it turns with the member 19, the member 20 must turn within it. If, in Fig. 1, the collar be turning with 19 it will slide circumferentially over the outer ends of the control pins 30 and 31 and will produce wear of both the pins and collar. To obviate this difficulty, I have divided the collar into two independently rotatable rings, designated 24ª and 24ᵇ in Fig. 14. The ring 24ª is provided with an interior rabbet 24ᶜ at its left-hand rim within which loosely fits the right-hand rim of the ring 24ᵇ, which rim is provided with an outwardly turned flange which forms a shoulder for engagement by a split ring 24ᵈ. This ring is adapted to be pushed into position within the rabbet where it snaps into an interior groove in the ring part 24ª. When so assembled, the rings may turn with the respective members 19 and 20 and will not wear the control pins or be worn by them.

I claim:

1. In a power-transmitting mechanism, an outer driving member and an inner driven member formed to provide a space between the members, the outer member being grooved interiorly to form cams, a plurality of clutch elements within said space, there being one of said elements for each of the said grooves, and an adjustable control device closely engaging and accurately controlling the location of said clutch elements and adapted at will so to locate them that they will engage the sides of their respective grooves and lock said driving and driven members together against relative movement in either direction, or to so locate them as to permit a one-way movement of said driven member with respect to the driving member.

2. Power-transmitting mechanism as set forth in claim 1, in which the adjustable control device consists of an angularly adjustable cage having fingers projecting between pairs of clutch elements and closely engaging the same to control the positions thereof.

3. Power-transmitting mechanism comprising a hollow rotatable driving member, a cylindrical driven member coaxial with and within the driving member but spaced therefrom, clutch elements within the space between said members, pairs of oppositely inclined cam surfaces on one of said members, there being a pair of said surfaces for each of said elements, an adjustable control device for said elements, control pins slidingly mounted in one of said members and adapted for engagement with said control device to hold the latter so that the clutch elements are maintained out of contact with their respective cam surfaces and means for selectively operating said control pins to hold the control device and the clutch elements from clutching engagement with said cam surfaces or to permit the clutch elements to engage said surfaces to rotate the driven with the driving member.

4. Power-transmitting mechanism as set forth in claim 3 in which the oppositely inclined cam surfaces are on the driving member and in which the driven member has a smooth exterior surface with which the clutch elements engage.

5. Power-transmitting mechanism as set forth in claim 3 in which the control pins for said control device are pins slidingly mounted in the driving member for movement toward and from the driven member.

6. Power-transmitting mechanism comprising a hollow rotatable outer member, a cylindrical inner member, said members being coaxial with a space between them, a plurality of pairs of divergently inclined cam surfaces on one of said members, a plurality of clutch elements within said space, there being a clutch element for each of said pairs of surfaces and located between the surfaces of the respective pairs, a cage for said elements having fingers thereon, said cage being mounted for limited rotational movement within said space and having the fingers thereon extending between the clutch elements, control pins slidingly mounted in one of the said members and adapted to engage with said cage to hold it and the clutch elements centrally positioned between the divergent surfaces of their respective pairs of cam surfaces but out of contact with said surfaces or to free the said cage to permit the clutch elements to engage the said cam surfaces, and manually operable means for controlling the said control pins.

7. Power-transmitting mechanism as set forth in claim 6 in which the control pins for the cage are mounted for radial sliding movement within that member which carries the pairs of divergent cam surfaces.

8. Power-transmission mechanism as set forth in claim 6 in which the hollow outer member is provided with the pairs of divergent cam surfaces and in which the control pins are mounted for radial sliding movements through said hollow outer member.

9. Power-transmitting elements as set forth in claim 6 in which the control pins are mounted for radial sliding movement through the said hollow outer member and in which the manually operable means for controlling the said control pins is a sleeve which surrounds the said hollow outer member, said sleeve being adapted to force the said pins inwardly into contact with said cage or to free the cage from said pins depending upon the position of said sleeve on the outer member.

10. In power-transmitting mechanism, two hollow outer members mounted end to end and rotatable at different speeds, an inner member within and coaxial with the outer members and spaced therefrom, said outer members being provided with V-shaped cam grooves in their inner surfaces, a plurality of clutch rollers within the space between the outer and inner members, there being a roller for and partially housed within each of said grooves, said rollers having diameters somewhat greater than the width of said space, two roller cages within said space and surrounding said inner member, said cages being disposed end to end and each having a series of fingers projecting therefrom, the fingers of one cage projecting between the rollers within one of the said outer members and the fingers of the other cage projecting between the rollers within the other of said outer members, said cages being adapted for frictional engagement with the said inner member and each of said cages having sockets in their outer peripheries, a plurality of control pins for and carried by each of said outer members, said pins being slidably mounted for radial movement with respect to the inner member and adapted when moved toward the latter member, to enter the respective sockets in said cages, a sleeve surrounding the outer members adapted to move the control pins into their sockets or to free the pins for disengagement from said sockets, and manually-controlled means for moving said sleeve, whereby the pins are selectively moved or released, for the purpose specified.

11. Power-transmitting mechanism as set forth in claim 10, in which certain of the sockets in the cages fit circumferentially entirely about the contained control pin when the latter is moved toward said inner member, whereby the cages are held non-rotatable with respect to their respective outer members, and in which other sockets are elongated in one direction only so that the pins entering them may have limited movements within the elongated parts of the slots, whereby the cages may move slightly in one direction with respect to the outer members but are held against such relative movement in the opposite direction, for the purpose specified.

12. Power-transmitting mechanism as set forth in claim 10 in which the sleeve for moving the control pins slides upon the outer members and is provided with a cam groove within its inner surface to release the pins when the groove is brought opposite the pins and to depress the pins when the groove is moved away from the pins.

13. Power-transmitting mechanism as set forth in claim 6 in which certain of the fingers of the cage are severed and are permitted to contact with the inner member, and means for pressing the severed fingers into frictional engagement with said inner member for the purpose specified.

14. Power-transmitting mechanism as set forth in claim 10, in which certain of the fingers of each of the cages are severed and are permitted to contact with the inner member, and means carried by the respective cages for pressing the severed fingers into frictional engagement with the inner member, for the purpose specified.

15. Power-transmitting mechanism as set forth in claim 10 in which certain fingers on each of the cages are severed and are permitted to contact with the inner member, and a resilient band for and extending about the group of fingers on each cage and pressing the severed fingers of the group into frictional engagement with the inner member.

16. Power-transmitting mechanism as set forth in claim 10 in which certain fingers on each of the cages are severed and are permitted to contact with the inner member, and a split metallic band for and extending about the group of fingers on each cage and pressing the severed fingers of the group into frictional engagement with the inner member.

17. In a power-transmitting mechanism a tubular shaft, a second shaft within said tubular shaft, said shafts having means through which they may be rotated at different speeds, a driven shaft coaxial with said tubular and second shaft, a drum-like extension on the driven shaft surrounding but spaced from the other shafts, a cage member rotatably mounted on the tubular shaft, a similar cage member surrounding the said second shaft, said cage member being in the space between the said drum-like extension and the tubular and second shafts, a plurality of clutch elements mounted in each of said cages, a series of radially-mounted and longitudinally-movable control pins carried by said extension, said pins being adapted to engage and control the said cages whereby the clutch elements may be caused to establish driving relation between the said tubular and said second shafts and the drum-like extension, and means for selectively controlling said pins to determine whether the elements of one cage or the other shall become active in establishing such driving relation.

18. A power-transmitting mechanism as set forth in claim 17 in which the said second shaft is provided with a rigidly atttached ring having the same internal and external diameters as the tubular shaft and being coaxial with said shaft, whereby the space between the said extension and the tubular and other shafts is continuous and of uniform width radially and the cages are of the same diameters internally and externally.

19. A power-transmitting mechanism as set forth in claim 10 in which the said sleeve is divided transversely into two rings, which are independently rotatable but slide together, for the purpose specified.

ARNOLD H. JESSEN.